Oct. 19, 1965

W. H. SINK 3,212,612

CLUTCH ASSIST DEVICE WITH PARALLEL ACTING RESILIENT MEANS

Filed Nov. 6, 1961

Oct. 19, 1965  W. H. SINK  3,212,612
CLUTCH ASSIST DEVICE WITH PARALLEL ACTING RESILIENT MEANS
Filed Nov. 6, 1961  2 Sheets-Sheet 2

3,212,612
CLUTCH ASSIST DEVICE WITH PARALLEL
ACTING RESILIENT MEANS
William H. Sink, Toledo, Ohio, assignor to Dana Corporation, Toledo, Ohio, a corporation of Virginia
Filed Nov. 6, 1961, Ser. No. 150,464
14 Claims. (Cl. 192—89)

This invention relates to clutch operating mechanisms in general and is particularly directed to clutch operating mechanisms having means for reducing the effort which a vehicle operator must exert in moving a normally engaged, spring loaded clutch to its disengaged position.

Generally, the friction clutches used for engaging and disengaging a vehicle engine from its transmission are of the normally engaged, spring-loaded type; that is, the clutch includes spring means for biasing a driven member into engagement with a drive member. These clutches must be capable of transmitting high torque loads particularly those used on heavy vehicles such as trucks and tractors. Inasmuch as the torque loading on these clutches is very high, it is apparent that the engaging springs employed must have a very high biasing effect or compressive strength to obtain sufficient pressure between the drive and driven members to prevent slippage. Thus, it is apparent that the greater the compressive strength or biasing effect of the springs, the more effective the clutch is for transmitting torque.

To disengage a clutch of this type, it is necessary to operate a foot pedal or a hand lever and upon release of the pedal or lever the clutch engaging springs cause the clutch to re-engage. The force supplied to operate the foot pedal or hand lever must be sufficient to overcome the bias of the clutch engaging springs. Since the declutching operation is performed many times, particularly when city traffic is encountered, the operator expends a considerable amount of physical energy, resulting in operator fatigue. Hence, clutch structures have been either excessively difficult and tiring to operate or have not had the required clutch engaging force to provide efficient torque transfer.

In an attempt to solve this problem, many prior types of assist or power devices have been employed to aid the operator in overcoming the bias of the clutch engaging springs. These prior assist devices include hydraulic and air assists as well as mechanical over-center spring type assists. However, these prior devices have been difficult to manufacture and expensive or have been such that operator control or "feel" has been lost. Also, the prior assist devices have been incorporated in the clutch operating mechanism somewhere between the throw-out bearing and the foot pedal or hand lever, i.e., with the release yoke, cross shaft or pivot support, connecting rods and linkage, or with the foot pedal or hand lever themselves. With these prior arrangements, that portion of the operating mechanism between the assist device and the clutch must transfer the full force required to overcome the clutch engaging springs and in so doing the resultant frictional resistance supplied by the linkage connections in the operating mechanism is greatly increased (frictional resistance increases with an increase in the transferred force) and adds to the required operating force in addition to reducing the life of the parts. Furthermore, prior art devices have required the use of spring means for counteracting the bias of the clutch engaging springs to aid the operator in disengaging the clutch.

It is an object of this invention to provide means associated with the engaging springs of the clutch device for reducing the biasing effect thereof and, therefore, the release effort required, upon a predetermined movement of the operating mechanism so that the operating mechanism is not subject to the full load of the engaging springs during the remainder of its movement.

Another object of this invention is to render a portion of the bias of the clutch engaging springs inoperative during clutch disengagement rather than providing additional means to counteract the existing clutch spring bias.

It is another object of this invention to provide a clutch operating or release mechanism which facilitates the movement of the clutch to a disengaged position while insuring the complete return of the clutch into engaged position immediately upon release of the operating mechanism.

Another object of this invention is to eliminate the installation cost required for assist devices provided in the operating or release mechanisms externally of the clutch device.

It is still another object of this invention to incorporate a clutch assist device or operator aiding mechanism as an integral part of the clutch structure to provide a low cost, trouble-free package.

A further object of this invention is to provide a clutch assist device or operator aiding mechanism which is disposed internally of the clutch cover to prevent damage to such mechanism.

It is a still further object of this invention to provide a clutch assist or operator aiding mechanism which is easy to manufacture, low in cost, and efficient in operation.

In one preferred embodiment of this invention a clutch device is provided comprising a flywheel and a driven disk assembly mounted on a driven shaft and adapted to cooperate with the flywheel to transmit torque from the flywheel to the driven shaft. Resilient clutch engaging springs are provided to normally bias the driven disk assembly and the flywheel into engagement. A standard operating or release mechanism is provided for the clutch device, and means is provided adjacent to, or internally of, and rotatable with the clutch device for reducing the bias effect of the clutch engaging springs upon a predetermined movement of the release mechanism toward clutch disengaged position.

Further objects and advantages of this invention will become apparent upon reading the following specification, together with the accompanying drawings which form a part hereof.

Figure 1:
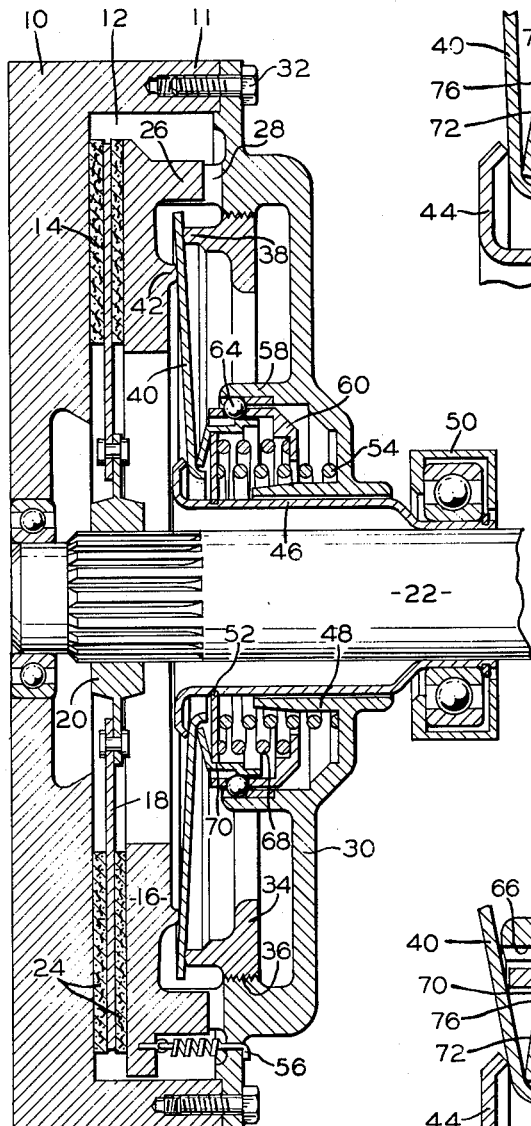
FIG. 1 is a longitudinal sectional view of a spring loaded clutch in its engaged position and incorporating one form of the present invention.
Figure 2:
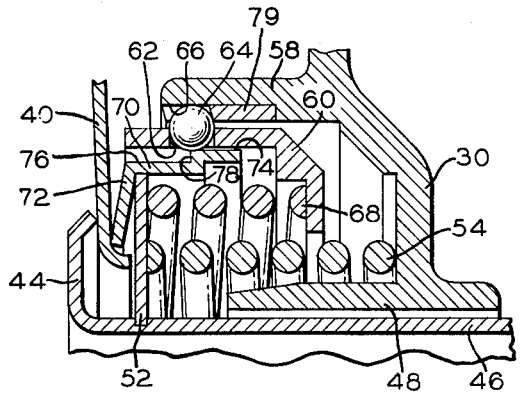
FIG. 2 is an enlarged view of a detail of this invention illustrating the parts in the position assumed during clutch engagement.
Figure 3:
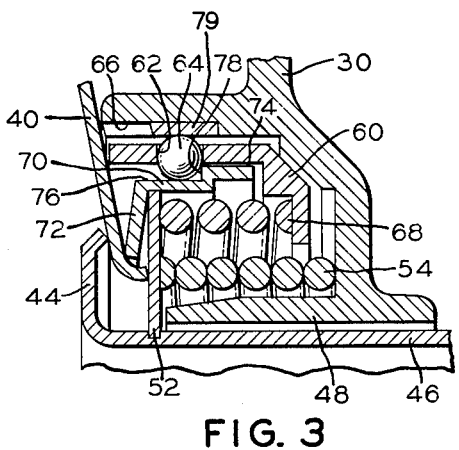
FIG. 3 is a view similar to FIG. 2 illustrating the relationship of the parts when the clutch is in disengaged position.

Referring now to the drawings and more particularly to FIGS. 1–3, a drive member in the form of a flywheel 10 of an internal combustion engine is provided with an axially extending rim 11 forming a cylindrical recess 12 for receiving a driven disk assembly 14 and a pressure plate 16.

The driven disk assembly 14 comprises an annular plate 18 riveted at its inner periphery to a hub 20 which is normally slidably splined on a driven shaft 22. The driven shaft 22 may be the input shaft of a transmission or other similar device. Annular plate 18 is provided at its outer periphery with the conventional friction rings 24 on both faces thereof. Thus, it is apparent that the driven disk assembly 14 is axially movable relative to the flywheel 10 and is adapted to be pressed thereagainst by the pressure plate 16.

The pressure plate 16 is provided with inwardly extending driving lugs 26 on the back face thereof which cooperate with lugs 28 extending inwardly from a clutch cover 30. The clutch cover 30 is secured to the rim 11 of the flywheel by means of a plurality of circumferentially arranged cap screws 32.

Means is provided to effect axial movement of the pressure plate 16 to compress the driven disk assembly 14 against the flywheel 10. More particularly, the clutch cover 30 is provided with an adjusting ring 34 secured internally thereto by a threaded engagement 36. The inwardly extending portion of the adjusting ring 34 provides a fulcrum 38 for a plurality of radially extending motion transmitting and multiplying levers 40. Radially inwardly from the fulcrum 38, the levers 40 press against an annular rib 42 provided on the back face of the pressure plate 16.

The inner ends of the plurality of levers 40 engage an annular trough-like portion 44 provided on the inner end of a release sleeve 46. The release sleeve 46 is disposed around the driven shaft 22 and slidably received in an axially extending annular boss 48 positioned centrally in the clutch cover 30. The outer end of the release sleeve 46 extends externally of the clutch cover 30 and has the conventional throw-out bearing 50 secured thereto. The throw-out bearing 50 is connected by a suitable operating mechanism (not shown) to a foot pedal or hand lever (not shown) which is selectively operable to cause axial movement of the release sleeve 46 in a well known manner. Adjacent the trough-like portion 44 and on the opposite side of the inner ends of the levers 40, the release sleeve 46 is provided with a radially extending annular plate 52. Disposed around the boss 48 on the cover 30 and compressed between the cover and the annular plate 52 is a large clutch engaging coil spring 54. Hence, it is apparent from the foregoing that the coil spring 54 biases the release sleeve 46 axially to the left. Since the inner ends of the levers 40 are positioned between the trough-like portion 44 and the annular plate 52 for movement with the release sleeve, the levers 40 are pivoted about fulcrum 38 and press against the annular rib 42 to compress the driven disk assembly 14 against the flywheel 10.

To release the clutch, the foot pedal or hand lever (not shown) is operated to move the release sleeve 46 to the right against the bias of coil spring 54 thereby pivoting levers 40 to release the pressure applied to the pressure plate 16. A plurality of small coil springs 56 (only one shown) are arranged radially outwardly from the levers 40 and are anchored at their opposite ends to the pressure plate 16 and the cover 30. These springs serve to withdraw the pressure plate 16 from the driven disk assembly 14 when the bias of the engaging spring 54 has been overcome. The clutch structure thus far described is generally conventional in design and operation and no further description thereof is deemed necessary.

Means is provided in addition to the coil spring 54 whereby the coil spring 54 and the additional means combine in an additive sense to effect clutch engagement. To this end, the clutch cover 30 is provided with an inwardly extending hub 58 concentric with and spaced radially outwardly from the boss 48. A substantially cup-shaped shift ring 60 is disposed around the coil spring 54 and adapted for slidable movement within the hub 58. The side walls of the shift ring 60 are provided with a plurality of circumferentially spaced apertures 62. A plurality of coupling or locking members in the form of balls 64 are movingly retained in the apertures 62 and are normally seated in an annular groove 66 provided on the internal surface of the hub 58 to lock the shift ring 60 to the hub. Another clutch engaging coil spring 68 is provided concentric with coil spring 54 and is compressed between the bottom of shift ring 60 and the annular plate 52 thereby biasing the release sleeve 46 to the left and acting in a parallel relationship with the coil spring 54 so that the biasing effect of the springs 68 and 54 are additive.

Another shift ring 70 is disposed within shift ring 60 and has a radially inwardly extending flange 72 which is positioned between annular plate 52 and the levers 40 for movement with the release sleeve 46. The shift ring 70 is movable within the shift ring 60 and has axially extending cylindrical portions 74 and 76 which are offset by a cam in the form of a step 78.

As is clearly shown in FIG. 2, with the clutch in its normally engaged position, the cylindrical portion 74 of shift ring 70 holds the balls 64 in annular groove 66 so that the shift ring 70 is locked to the clutch cover 30 and the coil spring 68 is operative to bias annular plate 52 and release sleeve 46 to the left thereby supplementing the bias of coil spring 54 and acting in parallel therewith.

To release the clutch as shown in FIG. 3, the release sleeve 46 is moved axially to the right and upon the first increments of movement thereof moves the shift ring 70 relative to the shift ring 60. This relative movement continues until the balls 64 become aligned with step 78 and are cammed radially inwardly by a hardened insert ring 79 provided in groove 66. Thus, the balls 64 are cammed out of the groove 66 and into engagement with the cylindrical surface 76 of the shift ring to release the shift ring 60 from the hub 58. With the shift ring 60 being released from the hub 58, the coil spring 68 tends to bias the shift ring 60 to the right; however, the balls 64 which are now held between the inner surface of the hub 58 and the cylindrical portion 76 of the shift ring 70 are engaged with the step 78 and prevent such movement. Thus, the shift ring 70 and the shift ring 60 are connected together for unitary movement with the coil spring 68 compressed therebetween in an inoperative position. Since the coil spring 68 is now rendered inoperative to supply a clutch engaging force, the operator has only to overcome the biasing force of the spring 54 to completely disengage the clutch and, hence, the only load applied through the clutch operating mechanism is that required to overcome the spring 54.

Upon the operator's release of the clutch operating mechanism, initially the spring 54 biases the release sleeve 46 to the left which carries the shift rings 60 and 70 therewith. When the balls 64 become aligned with the annular groove 66 they are cammed by the step 78 out of engagement therewith and into engagement with the groove 66 thereby permitting the shift ring 70 to move to the left relative to the shift ring 60, which is now locked to the hub 58, and render the bias of spring 68 operative to aid the spring 54 in supplying the clutch engaging force.

Figure 4:
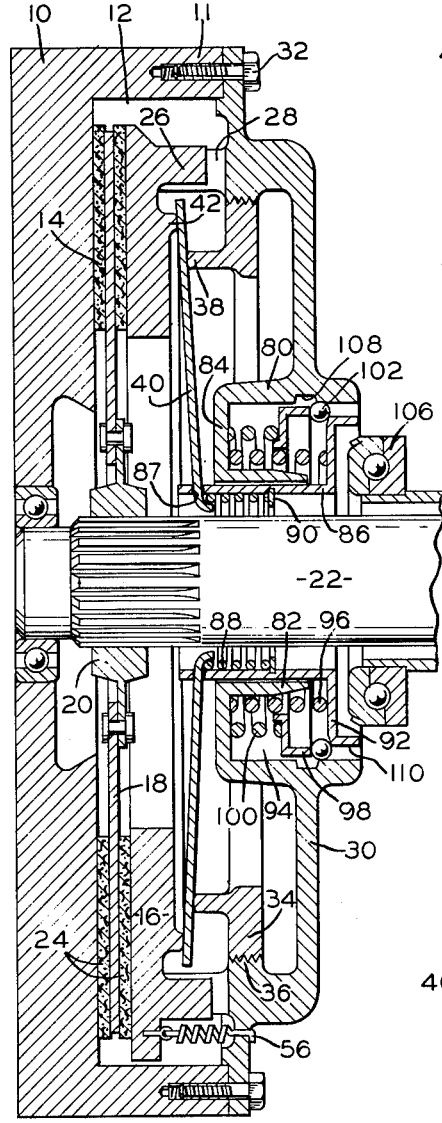
FIGS. 4, 5 and 6 are views similar to FIGS. 1, 2 and 3, respectively, illustrating another form of this invention.
Figure 5:
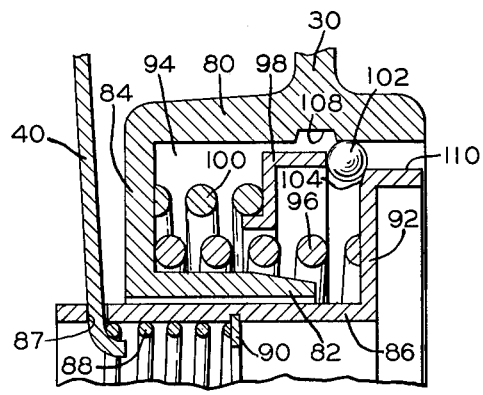
Figure 6:
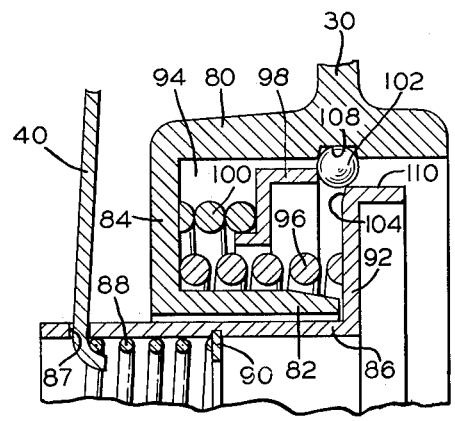

The embodiment of this invention shown in FIGS. 4-6, wherein parts corresponding to parts hereinbefore described are given like reference numerals, is similar to the embodiment shown in FIGS. 1-3 but differs therefrom in that the supplemental clutch engaging spring is rendered inoperative upon initial movement of the release mechanism by locking the spring to the clutch cover 30 rather than locking the spring to the release mechanism as already described in the first embodiment.

More particularly, the clutch cover 30 is provided with a modified central portion comprising a pair of radially spaced annular walls 80 and 82 connected at their inner portions by a radially extending bottom wall 84. The innermost wall 82 slidably receives an axially extending release sleeve 86. The left end of the release sleeve 86 is provided with openings 87 receiving one end of each of the plurality of levers 40. A positioning spring 88 is provided within the release sleeve 86 and is compressed between a snap ring 90 provided on the release sleeve and the ends of the levers 40 to securely position the levers in the opening 87. The levers 40 are fulcrumed on an adjusting ring 34 and engage an annular rib 42 on the pressure plate 16 in a manner similar to that shown in FIG. 1 except that the fulcrum 38 of the adjusting ring is positioned radially inwardly from the annular rib 42 on the pressure plate.

The right end of the release sleeve 86 is provided with a radially extending flange 92 which together with the annular side walls 80 and 82 and the bottom wall 84 of the clutch cover form a chamber 94. A large clutch engaging coil spring 96 is disposed in chamber 94 and extends around the inner wall 82 of the clutch cover. The coil spring 96 is compressed between bottom wall 84 of the clutch cover and the radial flange 92 of the release sleeve and normally biases the release sleeve to the right thereby pivoting levers 40 counterclockwise about fulcrum 38 and moving the pressure plate axially to compress the driven disk assembly 14 against the flywheel 10. A shift ring 98 is also provided in the chamber 94 and is adapted for axial movement therein.

Another clutch engaging coil spring 100 is provided in chamber 94 concentrically arranged with respect to coil spring 96. The coil spring 100 is compressed between the bottom wall 84 and the shift ring 98 for normally biasing the shift ring axially to the right into engagement with locking members in the form of a plurality of balls 102. The balls 102 bear against a bevelled portion 104 provided on the periphery of the radial flange 92 of the release sleeve. Thus, it is apparent that the bias of coil spring 100 is transferred to the release sleeve 86 thereby supplementing the coil spring 96 and acting in parallel therewith in biasing the clutch into engagement.

A throw-out bearing 106 is positioned adjacent the radial flange 92 and is operative in response to the operation of a foot pedal or hand lever (not shown) to move axially to the left into engagement with the radial flange to effect disengagement of the clutch. Upon initial movement of the release sleeve 86 to the left against the bias of parallel acting spring 96 and 100, the balls 102 and shift ring 98 are moved to the left therewith. This movement continues until the balls 102 are aligned with an annular groove 108 provided on the internal surface of the wall 80. When the balls 102 and the groove 108 become aligned and beveled portion 104 on the release sleeve cams the balls into the groove 108. Continued movement of the release sleeve brings a cylindrical surface 110 provided on the radial flange 92 into contact with the balls 102 to hold the balls in the groove 108 and lock the shift ring 98 to the clutch cover 30. With the shift ring 98 locked to the clutch cover, the coil spring 100 is rendered inoperative to bias the release sleeve 86 and the operator need apply only a force necessary to overcome the bias of coil spring 96 to effect disengagement of the clutch.

Upon re-engagement of the clutch, the coil spring 96 biases the release sleeve 86 to the right until the cylindrical surface 110 moves out of contact with the balls 102 at which time the shift ring 98 cams the balls out of the groove 108 and moves the balls to the right to the position shown in FIGS. 4 and 5.

From the foregoing description it is apparent that novel clutch structures have been provided wherein a portion of the force of the means biasing the clutch into engagement is rendered inoperative during the disengagement cycle so that the physical effort expended by an operator in moving the clutch to disengage position is substantially reduced, and which upon engagement allow the entire biasing means to bias the clutch to its engaged position. Also, it is apparent that the clutch operating mechanism need transfer only the force required to overcome a portion of the clutch engaging force since the operator aiding mechanism or assist device is disposed at the clutch itself rather than at a point in the operating mechanism further removed from the clutch.

From the foregoing description it is obvious that various changes in details which have been described and illustrated herein in order to explain the nature of this invention may be made by one skilled in the art within the principles and the scope of the invention as expressed in the appended claims.

What is claimed is:
1. A spring loaded clutch device comprising,
 (a) a drive member,
 (b) a driven member,
 (c) a pair of resilient means disposed in parallel re-relationship and normally operatively urging said drive member and said driven member in engagement,
 (d) and a release mechanism for said drive and driven members including means rendering one of said resilent means inoperative to wave said members into engagement while allowing the other of said resilient means to remain operative to urge said members into engagement upon a predetermined movement of the release mechanism.

2. In a spring loaded clutch device comprising,
 (a) a drive member,
 (b) a driven member,
 (c) a pressure plate rotatable with and axially movable relative to the drive member,
 (d) a pair of resilient means acting in parallel and operatively connected to said pressure plate for normally urging said pressure plate to press the driven member from the drive member,
 (e) and release means for overcoming the bias of said pair of resilient means to disengage the driven member from the drive member,
 (f) said release means including means disengaging one of said resilient means from its operative state while allowing the other to continue to urge said pressure plate upon predetermined movement of said release means.

3. A clutch device comprising,
 (a) a drive member,
 (b) a driven member,
 (c) a pressure plate for pressing the driven member into engagement with the drive member and being rotatable unitarily with the latter,
 (d) a cover rotatable with the drive member,
 (e) a release mechanism comprising radially extending levers fulcrumed on said cover and pressing on said pressure plate,
 (f) a plurality of parallel acting spring means acting on said levers to urge said pressure plate and effect engagement of the driven member with the drive member,
 (g) and means rendering one of said spring means ineffective to urge said pressure plate while allowing another of said spring means to remain effective to urge said pressure plate upon initial movement of said release mechanism.

4. A clutch device comprising in combination,
 (a) a flywheel,
 (b) a driven shaft coaxial with said flywheel,
 (c) a clutch cover connected to said flywheel for rotation therewith,
 (d) a driven disk assembly disposed within said clutch cover and rotatable with and axially movable relative to said driven shaft,
 (e) a pressure plate rotatable unitarily with said cover and disposed between said clutch cover and said driven disk assembly,
 (f) a plurality of radially extending levers fulcrumed on said clutch cover and pressing against said pressure plate and unitarily rotatable therewith,
 (g) a pair of resilient means coaxially arranged and compressed between said clutch cover and said levers and acting in parallel for urging said pressure plate to effect engagement of said driven disk assembly with said flywheel wherein the urging of said pressure plate is the total of the urging of each of said pair of resilient means,
 (h) a release sleeve on said driven shaft and operatively connected to said levers for overcoming the urging of said pair of resilient means, (i) and means operatively connected to one of said resilient means and rendering the same inoperative to urge said pressure plate upon a predetermined movement of said release sleeve while the other of said resilient means continues to urge said pressure plate.

5. In an operating mechanism the combination comprising,
   (a) a relatively stationary member,
   (b) a first member releasably coupled to said stationary member,
   (c) movable means,
   (d) resilient means compressed between said first member and said movable means for biasing said movable means,
   (e) and means releasing said first member from said stationary member and coupling said first member to said movable means upon a predetermined movement of said movable means whereby said resilient means is rendered inoperable to bias said movable means.

6. In a clutch device the combination comprising,
   (a) a drive member,
   (b) a driven member,
   (c) a cover member rotatable with said drive member,
   (d) a pressure plate connected for rotation with said cover member and being movable into engagement with said driven member to cause engagement thereof with said drive member,
   (e) linkage operatively connected to said pressure plate for causing movement thereof,
   (f) first resilient means biasing said linkage to effect movement of said pressure plate,
   (g) means releasably coupled to said cover member,
   (h) second resilient means compressed between said releasably coupled means and said linkage to aid said first resilient means in biasing said linkage,
   (i) and means releasing said releasably coupled means from said cover member and coupling said releasably coupled means to said linkage upon a predetermined movement of said linkage whereby said second resilient means is rendered inoperative to bias said linkage.

7. A clutch device comprising in combination,
   (a) a drive member,
   (b) a driven member,
   (c) a cover member connected to said drive member for rotation therewith,
   (d) a first resilient means disposed within said cover and operative to bias said drive member and said driven member into engagement,
   (e) a first shift ring movable relative to said cover member,
   (f) locking means carried by said first shift ring and cooperable with said cover member to lock said first shift ring to said cover member,
   (g) a second shift ring movable relative to said first shift ring, and operatively connected to said first resilient means.
   (h) a second resilient means compressed between said first shift ring and said second shift ring for moving said second shift ring to aid said first resilient means in effecting engagement of said drive member and said driven member,
   (i) means on said second shift ring cooperable with said locking means for normally holding said first shift ring locked to said cover,
   (j) and means on said cover member and said second shift ring cooperable with said locking means for releasing said first shift ring from said cover member and locking said first shift ring to said second shift ring upon a predetermined movement of said second shift ring relative to said first shift ring whereby said second resilient means becomes inoperative to aid said first resilient means in effecting engagement of said drive and driven members.

8. A clutch device comprising in combination,
   (a) a flywheel,
   (b) a driven shaft coaxial with said flywheel,
   (c) a clutch cover connected to said flywheel for rotation therewith and having an axially inwardly extending hub,
   (d) a driven disk assembly disposed within said clutch cover and rotatable with and axially movable relative to said driven shaft,
   (e) a pressure plate rotatable with said cover and disposed between said cover and said driven disk assembly,
   (f) a plurality of radially extending levers fulcrumed on said clutch cover and pressing against said pressure plate,
   (g) a release sleeve on said driven shaft and operatively connected to said levers for causing movement thereof,
   (h) a first resilient means compressed between said cover and said levers for biasing said pressure plate to effect engagement of said driven disk assembly with said flywheel,
   (i) a first shift ring adapted for axial movement relative to the hub on said cover,
   (j) locking means carried by said first shift ring and cooperable with said hub to lock said first shift ring to said hub,
   (k) a second shift ring operatively connected to said levers and movable relative to said first shift ring,
   (l) a second resilient means compressed between said first shift ring and said said second shift ring to aid said first resilient means in biasing said pressure plate,
   (m) means on said second shift ring cooperable with said locking means for normally holding said first shift ring locked to said hub,
   (n) and means on said hub and said second shift ring cooperable with said locking means for releasing said first shift ring from said hub and locking said first shift ring to said control shift ring upon a predetermined movement of said second shift ring relative to said first shift ring whereby said second resilient means becomes inoperative to aid said first resilient means in biasing said pressure plate.

9. In a clutch device the combination comprising,
   (a) a drive member,
   (b) a driven member,
   (c) a cover member rotatable with said drive member,
   (d) a pressure plate connected for rotation with said cover member and being movable into engagement with said driven member to cause engagement thereof with said drive member,
   (e) linkage operatively connected to said pressure plate and rotatable unitarily therewith for causing movement thereof,
   (f) first resilient means biasing said linkage to effect movement of said pressure plate,
   (g) movable means operatively connected to said linkage,
   (h) second resilient means compressed between said movable means and said cover member and acting in parallel with said first resilient means to aid said first resilient means in biasing said linkage whereby the biasing on said linkage is the combined biasing of both said resilient means,
   (i) and means coupling said movable means to said cover member and operatively disconnecting said movable means from said linkage upon a predermined movement of said linkage whereby said second resilient means is rendered inoperative to bias said linkage, 10. A clutch device comprising,
(a) drive member,
(b) a driven member,
(c) a clutch cover connected to said drive member for rotation therewith,
(d) a member movable relative to said cover member and operatively connected to said drive and driven members,
(e) a first resilient means compressed between said cover member and said movable member for effecting engagement of said drive and driven members,
(f) a shift ring movable relative to said cover member and operatively connected to said movable member,
(g) a second resilient means compressed between said cover member and said shift ring to aid said first resilient means in biasing said drive and driven members into engagement,
(h) and locking means associated with said shift ring and cooperable with said cover member to lock said shift ring to said cover member upon a predetermined movement of said movable member whereby said second resilient means becomes inoperative to aid said first resilient means in biasing said drive and driven members into engagement.

11. A clutch device comprising in combination,
(a) a flywheel,
(b) a driven shaft coaxial with said flywheel,
(c) a clutch cover connected to said flywheel for rotation therewith and having an axially extending hub,
(d) a driven disk assembly disposed with said clutch cover and rotatable with and axially movable relative to said driven shaft,
(e) a pressure plate rotatable with said cover and disposed between said cover and said driven disk assembly,
(f) a plurality of radially extending levers fulcrumed on said clutch cover and pressing against said pressure plate,
(g) a release sleeve concentric with said driven shaft and operatively connected to said levers for causing movement thereof,
(h) a first resilient means compressed between said cover and said release sleeve for biasing said pressure plate to effect engagement of said driven disk assembly with said flywheel,
(i) a shift ring axially movable relative to the hub on said cover, and operatively connected to said release sleeve,
(j) a second resilient means compressed between said cover and said shift ring to aid said first resilient means in biasing said pressure plate,
(k) and locking means associated with said shift ring and cooperable with said hub to lock said shift ring to said hub upon a predetermined movement of said release sleeve whereby said second resilient means becomes inoperative to aid first resilient means in biasing said pressure plate.

12. A spring loaded clutch device comprising in combination,
(a) a drive member,
(b) a driven member,
(c) resilient means normally operatively biasing said members into engagement,
(d) a reaction mechanism operatively connected to one of said members,
(e) and a release mechanism for said drive and driven members being movable relative to said reaction mechanism and including means for directing at least a portion of the biasing effect of resilient means entirely within one of said mechanisms upon a predetermined movement of said release mechanism whereby said portion of said biasing effect is inoperative to bias said members into engagement.

13. A spring loaded clutch device comprising in combination,
(a) a drive member,
(b) a driven member adapted to be pressed into engagement with said drive member,
(c) a reaction mechanism operatively connected to one of said members,
(d) a release mechanism movable relative to said reaction mechanism,
(e) resilient means reactively positioned between said mechanisms and operative to bias said release mechanism to move relative to said reaction mechanism to a pressing position,
(f) at least a portion of said release mechanism being operatively disposed between said resilient means and said members and being operative to press said members into engagement upon being biased relative to said reaction means by said resilient means to its pressing position,
(g) said release mechanism being movable relative to said reaction mechanism against the biasing effect of said resilient means to a non-pressing position to remove the pressing load from said members,
(h) and means operative to direct at least a portion of the biasing effect of said resilient means entirely within one of said mechanisms upon a predetermined movement of said release mechanism toward its non-pressing position whereby said portion of said biasing effect is inoperative to bias said members into engagement.

14. In an operating device for a clutch the combination comprising,
(a) a rotatable driving member having an axis of rotation and including a relatively stationary member movable unitarily and coaxially therewith,
(b) a pressure plate means including release means therefor with both being axially movable relative to said stationary member and coaxially rotatable therewith,
(c) a first member operatively connected to said release means,
(d) resilient means compressed between said stationary member and said first member for biasing said release means and said pressure plate means axially relative to said stationary member,
(e) and means operatively disconnecting said first member from said release means and operatively connecting said first member to said relatively stationary member upon a predetermined movement of said release means whereby said resilient means is rendered inoperative to bias said release means.

References Cited by the Examiner
UNITED STATES PATENTS

| | | | |
|---|---|---|---|
| 888,523 | 5/08 | Bramley-Moore | 192—89 |
| 995,043 | 6/11 | Swartz | 192—89 X |
| 1,717,355 | 6/29 | Carhart | 192—68 X |
| 2,002,841 | 5/35 | Tatter | 192—68 X |
| 2,107,954 | 2/38 | Morton et al. | 192—68 X |

DAVID J. WILLIAMOWSKY, *Primary Examiner.*

THOMAS HICKEY, *Examiner.*

UNITED STATES PATENT OFFICE
CERTIFICATE OF CORRECTION

Patent No. 3,212,612 October 19, 1965

William H. Sink

It is hereby certified that error appears in the above numbered patent requiring correction and that the said Letters Patent should read as corrected below.

Column 6, line 5, strike out "re-"; line 11, for "wave" read -- urge --; line 24, for "from" read -- into engagement with --; column 8, line 42, for "control" read -- second --.

Signed and sealed the 26th day of July 1966.

(SEAL)
Attest:

ERNEST W. SWIDER
Attesting Officer

EDWARD J. BRENNER
Commissioner of Patents